US008396248B2

(12) United States Patent
Mostafavi et al.

(10) Patent No.: US 8,396,248 B2
(45) Date of Patent: Mar. 12, 2013

(54) SEQUENTIAL STEREO IMAGING FOR ESTIMATING TRAJECTORY AND MONITORING TARGET POSITION

(75) Inventors: Hassan Mostafavi, Los Altos, CA (US); Alexander Sloutsky, Burlingame, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 1205 days.

(21) Appl. No.: 12/211,686

(22) Filed: Sep. 16, 2008

(65) Prior Publication Data

US 2010/0067739 A1    Mar. 18, 2010

(51) Int. Cl.
G06K 9/00       (2006.01)
(52) U.S. Cl. .................................. 382/103; 382/106
(58) Field of Classification Search .................. None
See application file for complete search history.

(56) References Cited

U.S. PATENT DOCUMENTS

| | | | | |
|---|---|---|---|---|
| 4,894,776 A | * | 1/1990 | Dekel | 382/131 |
| 5,446,548 A | * | 8/1995 | Gerig et al. | 356/620 |
| 5,859,922 A | * | 1/1999 | Hoffmann | 382/128 |
| 6,045,229 A | * | 4/2000 | Tachi et al. | 353/28 |
| 6,148,095 A | * | 11/2000 | Prause et al. | 382/131 |
| 6,252,924 B1 | | 6/2001 | Davantes et al. | |
| 6,296,613 B1 | * | 10/2001 | Emmenegger et al. | 600/459 |
| 6,381,302 B1 | * | 4/2002 | Berestov | 378/41 |
| 6,522,775 B2 | * | 2/2003 | Nelson | 382/133 |
| 6,888,919 B2 | | 5/2005 | Graf | |
| 7,035,450 B1 | * | 4/2006 | Muller et al. | 382/154 |
| 7,103,212 B2 | * | 9/2006 | Hager et al. | 382/154 |
| 7,711,087 B2 | * | 5/2010 | Mostafavi | 378/65 |
| 2004/0092815 A1 | * | 5/2004 | Schweikard et al. | 600/425 |
| 2005/0084073 A1 | | 4/2005 | Seppi et al. | |
| 2005/0180544 A1 | * | 8/2005 | Sauer et al. | 378/195 |
| 2008/0069445 A1 | | 3/2008 | Weber | |
| 2008/0219535 A1 | | 9/2008 | Mistretta et al. | |

FOREIGN PATENT DOCUMENTS

CN       1839754 A       10/2006

OTHER PUBLICATIONS

International Search Report dated Nov. 17, 2009 for Application No. PCT/US09/57125.
Written Opinion of the International Searching Authority for International Application No. PCT/US2009/057125 Mailed on Nov. 17, 2009.
Extended European Search Report for EP Application No. 09815099.8, Dated Dec. 22, 2011.
Paulo Dias et al., "Registration and Fusion of Intensity and Range Data for 3D Modelling of Real World Scenes", IEEE, Oct. 6, 2003, pp. 418-425, Proceeding of the Fourth International Conference on 3-D Digital Imaging and Modeling.
First Office Action and Search Report dated Nov. 23, 2012, for Chinese patent application No. 200980136071.1.
Machine Translation of English Abstract for CN 1839754 A dated Oct. 4, 2006.

* cited by examiner

Primary Examiner — Manav Seth
(74) Attorney, Agent, or Firm — Vista IP Law Group, LLP

(57) ABSTRACT

A method for determining a position of a target includes obtaining a first image of the target, obtaining a second image of the target, wherein the first and the second images have different image planes and are generated at different times, processing the first and second images to determine whether the target in the first image corresponds spatially with the target in the second image, and determining the position of the target based on a result of the act of processing. Systems and computer products for performing the method are also described.

47 Claims, 10 Drawing Sheets

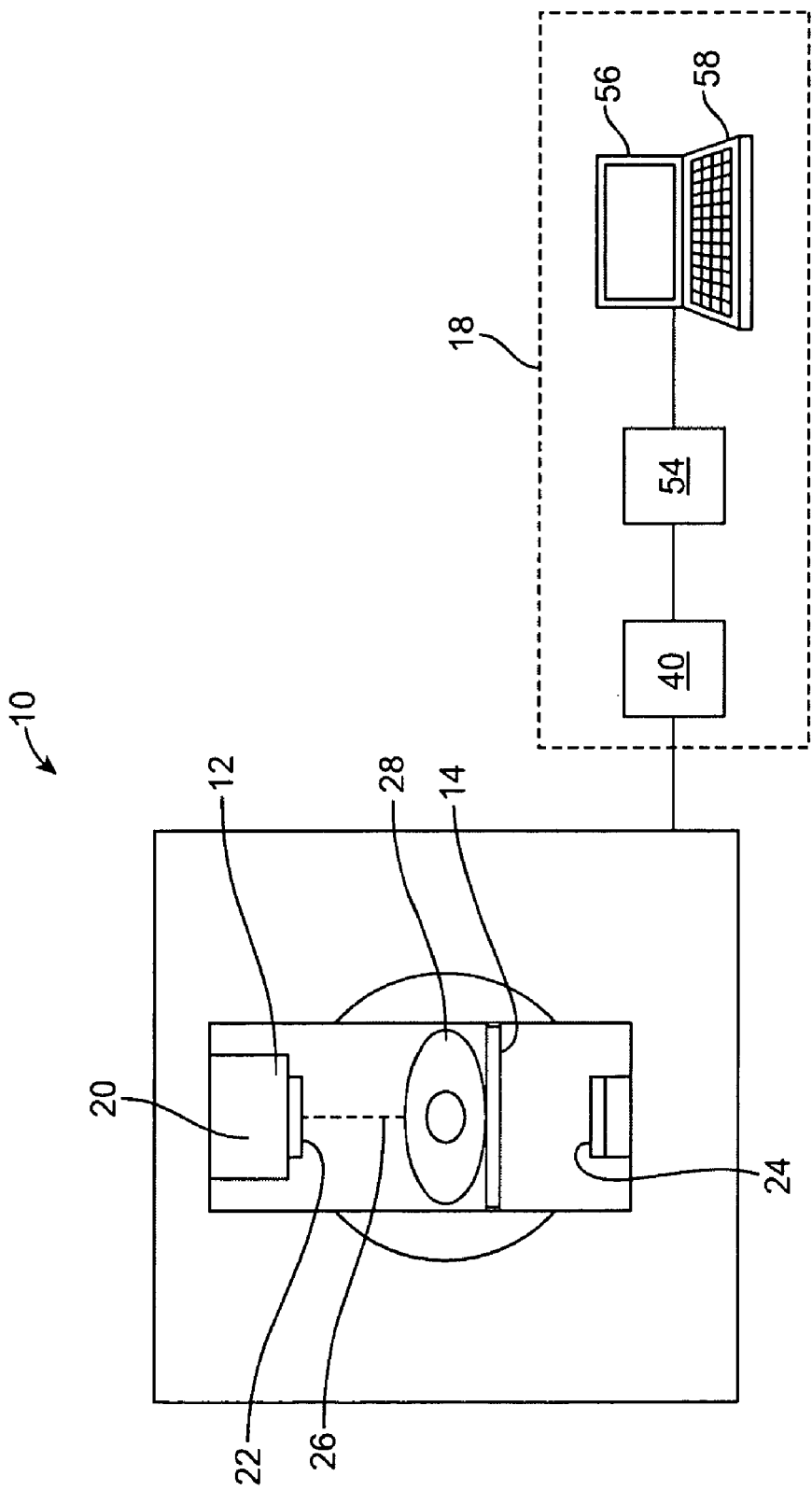

SEQUENTIAL STEREO IMAGING FOR ESTIMATING TRAJECTORY AND MONITORING TARGET POSITION

FIELD

This invention relates to systems and methods for determining a position of a target using imaging technique.

BACKGROUND

Radiation therapy has been employed to treat tumorous tissue. In radiation therapy, a high energy beam is applied from an external source towards the patient. The external source, which may be rotating (as in the case for arc therapy), produces a collimated beam of radiation that is directed into the patient to the target site. The dose and placement of the dose must be accurately controlled to ensure that the tumor receives sufficient radiation, and that damage to the surrounding healthy tissue is minimized.

Sometimes, before a radiation therapy is performed, the target region of the patient is imaged using a CT system for diagnostic purpose, or for treatment planning. For the case in which the target region moves in a periodic motion (e.g., due to breathing), the CT system may be used to determine volumetric images of the target when the target is at different breathing states, so that the volumetric images may be played back as a video stream. For such purpose, projection images of the target when the target is at different breathing states are acquired, and a breathing monitoring device is used to determine breathing states of the patient as the CT system acquires the projection images. After the imaging session, the projection images are then sorted according to the recorded breathing states of the patient when the corresponding projection images are acquired. The breathing monitoring device is required to track the breathing states accurately. The tracked breathing states cannot be too coarse (e.g., they cannot merely indicate whether the patient is at an inhale state or an exhale state) because otherwise, the resulting video stream would be too coarse for diagnostic and treatment planning purposes.

Also, sometimes during a radiation therapy, the patient may also be undergoing breathing motion. In such cases, it may be desirable to determine positions of a moving target such that a radiation beam may be adjusted accordingly to treat the target. Existing technique for determining a three dimensional position of an object requires simultaneous imaging of a target by two or more imaging systems. In such cases, the 3D position of a target cannot be determined when only one imaging system is available. Also, existing systems that are designed to use two imaging systems simultaneously cannot use images acquired at different times to determine a target position. In addition, existing systems that are designed to use two imaging systems simultaneously require the frame rates of the two imaging systems be the same and that they be synchronized. In such cases, the existing systems cannot determine a position of the target at all times if the two imaging systems have different frame rates, or if the image acquisitions by the two imaging systems are not synchronized.

SUMMARY

In accordance with some embodiments, a method for determining a position of a target includes obtaining a first image of the target, obtaining a second image of the target, wherein the first and the second images have different image planes and are generated at different times, processing the first and second images to determine whether the target in the first image corresponds spatially with the target in the second image, and determining the position of the target based on a result of the act of processing.

In accordance with other embodiments, a system for determining a position of a target includes a processor, wherein the processor is configured for obtaining a first image of the target, obtaining a second image of the target, wherein the first and the second images have different image planes and are generated at different times, processing the first and second images to determine whether the target in the first image corresponds spatially with the target in the second image, and determining the position of the target based on a result of the act of processing.

In accordance with other embodiments, a computer product having a medium for storing a set of instruction, an execution of which causes a process to be performed, the process includes obtaining a first image of the target, obtaining a second image of the target, wherein the first and the second images have different image planes and are generated at different times, processing the first and second images to determine whether the target in the first image corresponds spatially with the target in the second image, and determining the position of the target based on a result of the act of processing.

In accordance with other embodiments, a method for determining a position of a target includes obtaining a first image of the target, obtaining a second image of the target, wherein the first and the second images are generated at different times, processing the first image to determine a first line that intersects a plane of the first image, processing the second image to determine a second line that intersects a plane of the second image, determining a first distance between the first and second lines, and determining the position of the target based at least in part on the determined first distance.

In accordance with other embodiments, a system for determining a position of a target includes a processor, wherein the processor is configured for obtaining a first image of the target, obtaining a second image of the target, wherein the first and the second images are generated at different times, processing the first image to determine a first line that intersects a plane of the first image, processing the second image to determine a second line that intersects a plane of the second image, determining a first distance between the first and second lines, and determining the position of the target based at least in part on the determined first distance.

In accordance with other embodiments, a computer product having a medium for storing a set of instruction, an execution of which causes a process to be performed, the process includes obtaining a first image of the target, obtaining a second image of the target, wherein the first and the second images are generated at different times, processing the first image to determine a first line that intersects a plane of the first image, processing the second image to determine a second line that intersects a plane of the second image, determining a first distance between the first and second lines, and determining the position of the target based at least in part on the determined first distance.

Other and further aspects and features will be evident from reading the following detailed description of the embodiments, which are intended to illustrate, not limit, the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIG. 4 illustrates another radiation system with which embodiments described herein may be practiced;

DESCRIPTION OF THE EMBODIMENTS

Figure 1:
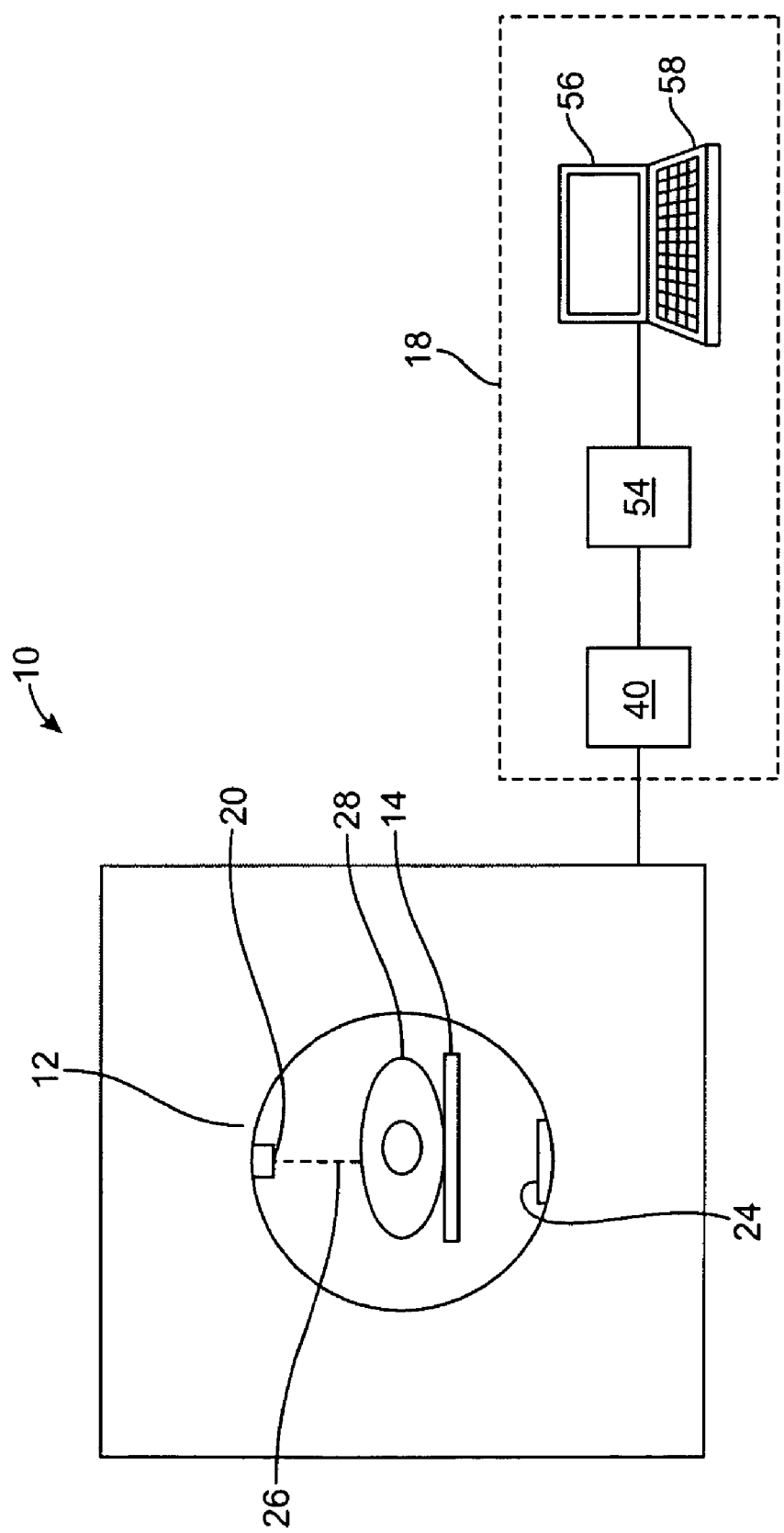
FIG. 1 illustrates a radiation system with which embodiments described herein may be practiced.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates a computed tomography system 10 in accordance with some embodiments. The system 10 includes a gantry 12, and a panel 14 for supporting a patient 28. The gantry 12 includes an x-ray source 20 that projects a beam 26 of x-rays towards a detector 24 on an opposite side of the gantry 12 while the patient 28 is positioned at least partially between the x-ray source 20 and the detector 24. By means of non-limiting examples, the beam of x-rays can be a cone beam or a fan beam. The detector 24 has a plurality of sensor elements configured for sensing a x-ray that passes through the patient 28. Each sensor element generates an electrical signal representative of an intensity of the x-ray beam as it passes through the patient 28.

The system 10 also includes a control system 18. In the illustrated embodiments, the control system 18 includes a processor 54, such as a computer processor, coupled to a control 40. The control system 18 may also include a monitor 56 for displaying data and an input device 58, such as a keyboard or a mouse, for inputting data. The operation of the radiation source 20 and the gantry 12 are controlled by the control 40, which provides power and timing signals to the radiation source 20, and controls a rotational speed and position of the gantry 12, based on signals received from the processor 54. Although the control 40 is shown as a separate component from the gantry 12 and the processor 54, in alternative embodiments, the control 40 can be a part of the gantry 12 or the processor 54.

It should be noted that the system 10 is not limited to the configuration described above, and that the system 10 may have other configurations in other embodiments. For example, in other embodiments, the system 10 may have a different shape. In other embodiments, the radiation source 20 of the system 10 may have different ranges of motions and/or degrees of freedom. For example, in other embodiments, the radiation source 20 may be rotatable about the patient 28 completely through a 360° range, or partially through a range that is less than 360°. Also, in other embodiments, the radiation source 20 is translatable relative to the patient 28. Further, the radiation source 20 is not limited to delivering diagnostic energy in the form of x-ray, and may deliver treatment energy for treating a patient.

During a scan to acquire x-ray projection data (i.e., CT image data), the gantry 12 rotates about the patient 28 at different gantry angles, so that the radiation source 20 and the imager 24 may be used to obtain images at different gantry angles. As the system 10 is operated to obtain images at different gantry angles, the patient 28 is breathing. Thus, the resulting images at different gantry angles may correspond to different phases of a breathing cycle for the patient 28. After the scan is completed, the projection images at different gantry angles are stored, e.g., in a memory, and the projection images are processed to sort the images so that images at different gantry angles that correspond to a same phase of a breathing cycle are binned (e.g., associated with each other). The binned images for a specific phase of a respiratory cycle can then be used to generate a reconstructed three-dimensional CT image for that phase.

Figure 2:
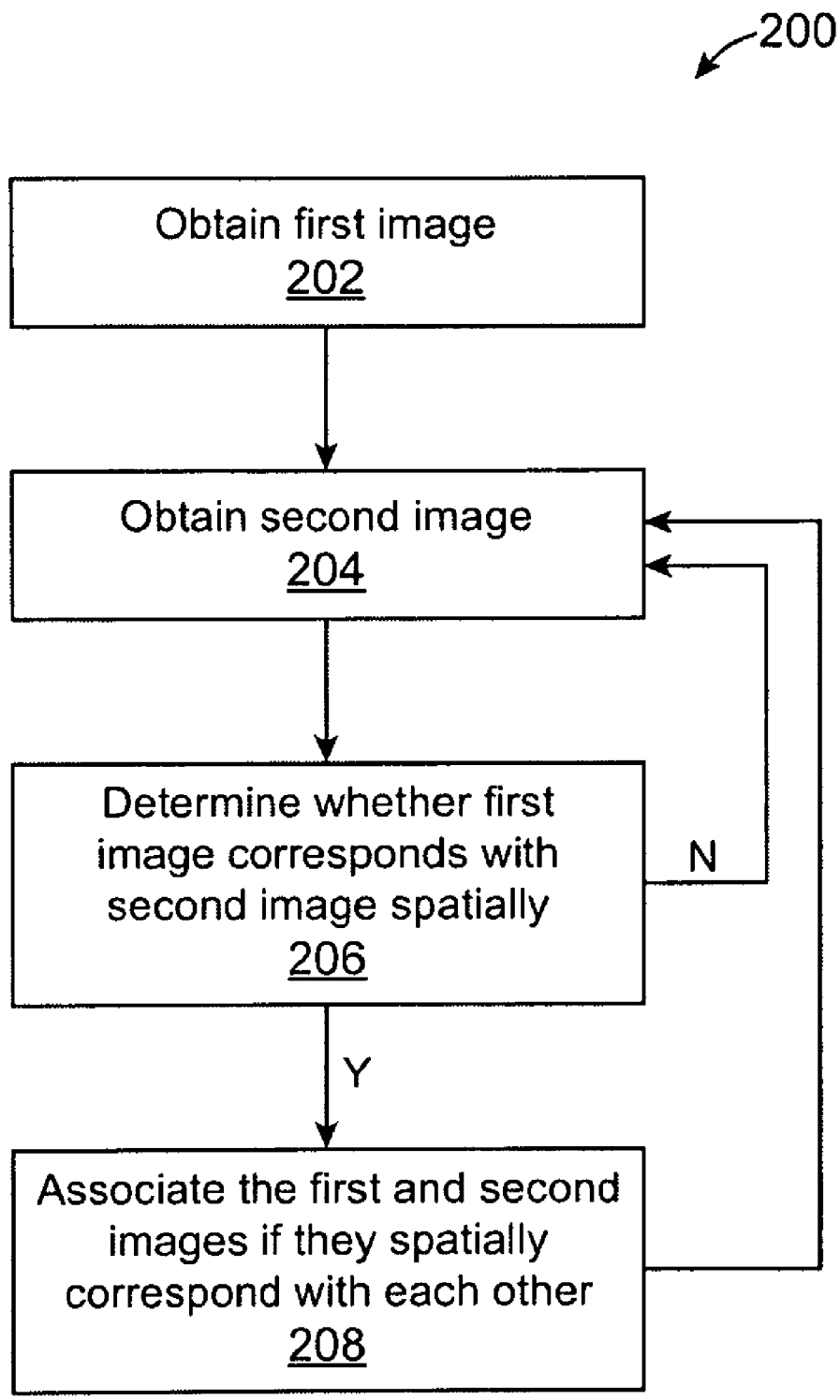
FIG. 2 illustrates a method for associating two images that spatially correspond with each other.
Figure 3:
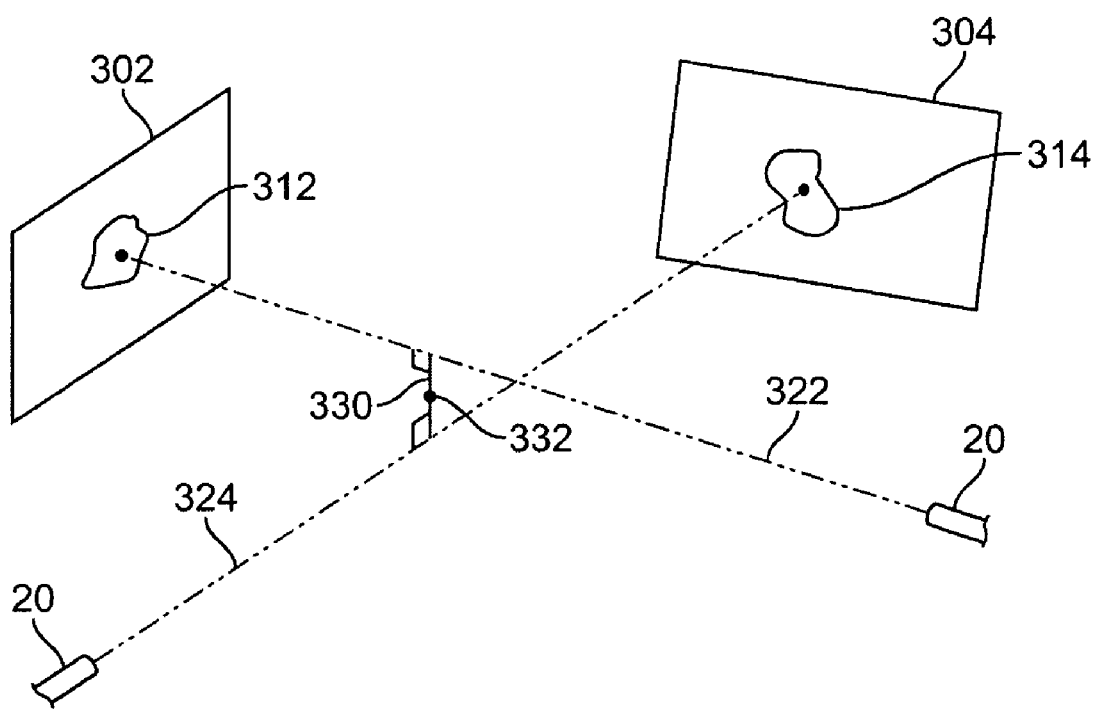
FIG. 3 illustrates a technique for determining whether two images spatially correspond with each other.

FIGS. 2 and 3 illustrate a method of associating two or more images in accordance with some embodiments. First, a first image is obtained (Step 202). The first image may be a projection image that is created by the system 10. Next, a second image is obtained (Step 204). The second image may be a projection image created by the system 10, or another system that is different from the system 10. The processor 54 than processes the first and second images to determine if the first and second images correspond with each other spatially (Step 206). In the illustrated embodiments, the first and second images are considered to correspond with each other spatially if, when the first image is created, a target in 3D space is located at a position that is the same, or approximately the same, as the target's position when the second image is created. A target may be an anatomical feature, one or more implant (such as radio-opaque markers), a medical device (e.g., a surgical clip), or other objects that is capable of being imaged. In other embodiments, the target may be any track point selected to track an object. For example, the track point may be a center of mass for a plurality of markers. Thus, the target needs not be an object itself.

If the first and second images correspond with each other spatially, the processor 54 then associates the first image with the second image (Step 208). In some embodiments, the first and second images that have been associated with each other may be used in a triangulation technique to estimate/determine a position of a target, as described below. In other embodiments, the first and second images may be used to reconstruct a three-dimensional CT image. This is because the target in the first image is at a position that is the same, or approximately the same, as its position when the second image is created, even though, the first and second images are obtained at different times. In the illustrated embodiments, the act of associating the first and second images is performed by the processor 54 in real time. For example, as the system 10 generates a sequence of projection images, the processor 54 may be configured to associate the current projection images (input images) with previously acquired projection images (either in the same sequence, or in a previously acquired sequence) in real time (shortly, e.g., less than 1 second, after the current image is generated). In other embodiments, the act of associating the first and second images may be performed by the processor 54 retrospectively.

FIG. 3 illustrates a technique for determining whether two images correspond with each other spatially in accordance with some embodiments. In the illustrated example, images 302, 304 are generated using the system 10 by rotating the radiation source 20 at different gantry angles. Thus, the images 302, 304, are obtained at different times. The object (not shown in the figure for clarity) that is being imaged appears as image 312 and image 314, in image frames 302, 304, respectively. The object may be a part of a patient, an implant, a medical device, or any object that is capable of being imaged. While the images 302, 304 are being created, the object may be undergoing motion. The position of the object when the first image 302 is created may be determined by creating a first line 322 that extends from the source 20 to the object image 312 (e.g., a target) in the first image frame 302, and creating a second line 324 that extends from the source 20 to the object image 314 (e.g., a target) in the second image frame 304. A distance 330 (an epipolar distance) measured in a direction that is perpendicular to both the first line 322 and the second line 324 is then determined. If the distance 330 is below a prescribed threshold, e.g., 5 mm or less, then it may be hypothesized that the object is at approximately a same location when the first and second images 302, 304 are generated. In some cases, the hypothesis may be confirmed using other assumptions, such as, an assumption that the object was moving on a repeating—but not necessarily periodic—trajectory, especially when only two images are used. In some embodiments, the position of the midpoint 322 at the epipolar line may be used as the position of the object. For the case in which the lines 322, 324 intersect each other, the position of the intersection point may be used as the position of the object.

It should be noted that the system 10 that may be used to generate image(s) for use in the method 200 is not limited to the example described previously. In other embodiments, other imaging systems having different configurations may be used. For example, FIG. 4 illustrates another embodiment of the system 10 that may be used. The system 10 of FIG. 4 is a treatment system that includes a gantry 12, a patient support 14 for supporting a patient, and a control system 18 for controlling an operation of the gantry 12. The gantry 12 is in a form of an arm. The system 10 also includes a radiation source 20 that projects a beam 26 of radiation towards a patient 28 while the patient 28 is supported on support 14, and a collimator system 22 for controlling a delivery of the radiation beam 26. The radiation source 20 can be configured to generate a cone beam, a fan beam, or other types of radiation beams in different embodiments.

In the illustrated embodiments, the radiation source 20 is a treatment radiation source for providing treatment energy. In other embodiments, in addition to being a treatment radiation source, the radiation source 20 can also be a diagnostic radiation source for providing diagnostic energy. In such cases, the system 10 will include an imager, such as the imager 100, located at an operative position relative to the source 20 (e.g., under the support 14). In some embodiments, the treatment energy is generally those energies of 160 kilo-electron-volts (keV) or greater, and more typically 1 mega-electron-volts (MeV) or greater, and diagnostic energy is generally those energies below the high energy range, and more typically below 160 keV. In other embodiments, the treatment energy and the diagnostic energy can have other energy levels, and refer to energies that are used for treatment and diagnostic purposes, respectively. In some embodiments, the radiation source 20 is able to generate X-ray radiation at a plurality of photon energy levels within a range anywhere between approximately 10 keV and approximately 20 MeV. Radiation sources capable of generating X-ray radiation at different energy levels are described in U.S. patent application Ser. No. 10/033,327, entitled "RADIOTHERAPY APPARATUS EQUIPPED WITH AN ARTICULABLE GANTRY FOR POSITIONING AN IMAGING UNIT," filed on Nov. 2, 2001, and U.S. patent application Ser. No. 10/687,573, entitled "MULTI-ENERGY X-RAY SOURCE," filed on Oct. 15, 2003. In further embodiments, the radiation source 20 can be a diagnostic radiation source. In the illustrated embodiments, the radiation source 20 is coupled to the arm gantry 12. Alternatively, the radiation source 20 may be located within a bore.

In some embodiments, when using the system 10 of FIG. 4, the radiation source 20 is rotated about the patient 28 to deliver treatment radiation from a plurality of gantry angles, for example, as in arc therapy. At each gantry angle, after a treatment radiation has been delivered to treat the patient, the system 10 may also deliver radiation to generate an image. This may be performed before treatment to verify a position of a target, or after delivery of a treatment beam to verify a delivery of radiation (e.g., to verify dose and/or position of delivered radiation). The radiation for generating the image may be a beam having diagnostic energy (if the source is capable of delivering diagnostic beam), or alternatively, it may be a beam having treatment energy. Thus, the images (the first image in Step 202, and/or the second image in Step 204) that may be used to perform the method 200 may be images created using diagnostic energy or treatment energy.

In other embodiments, instead of the configuration shown in FIG. 4, the system 10 may include a treatment radiation source and a diagnostic radiation source that are separated from each other. For example, the system 10 may have an imaging system for generating images using high energy beam (e.g., MV imaging system) and an imaging system for generating images using low energy beam (e.g., kV imaging system). The high energy imaging system and the low energy imaging system may be integrated into a same gantry (e.g., oriented relative to each other at 90°), or alternatively, may be separate machines that are placed adjacent to each other. During use, high energy images and low energy images are generated in an interleaved manner. The resulting images may then be used in the method 200. Thus, the image in step 202 may be a low energy image, and the image in step 204 may be a high energy image, or vice versa.

Figure 5A:
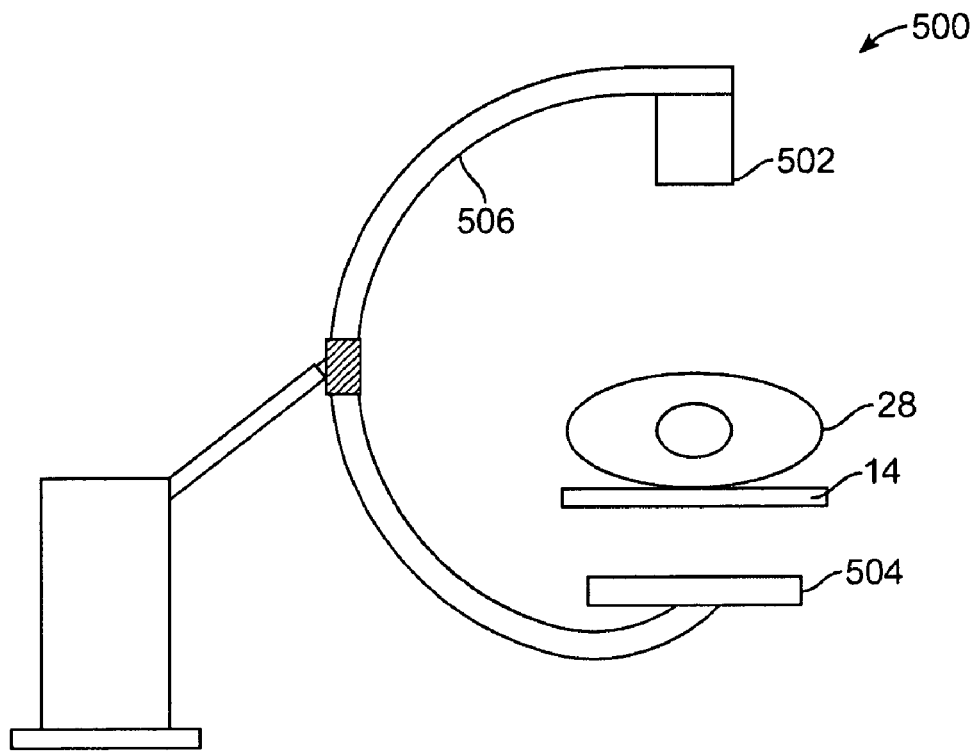
FIG. 5A illustrates a fluoroscope with which embodiments described herein may be practiced.
Figure 5B:
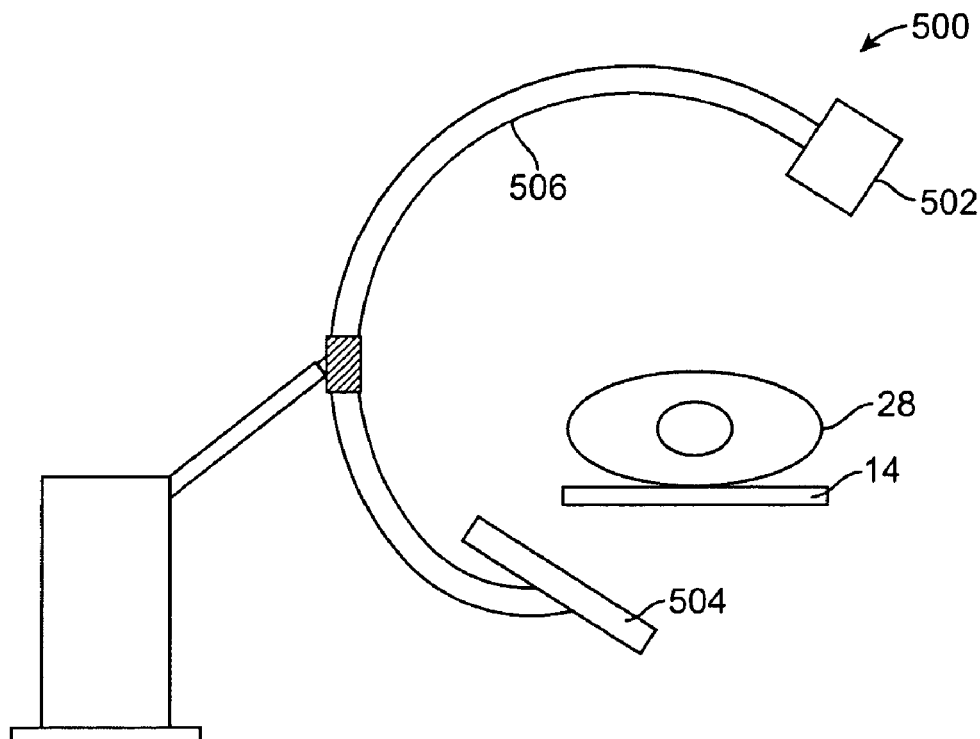
FIG. 5B illustrates the fluoroscope of FIG. 5A, showing the x-ray source and imager at different positions.

FIGS. 5A and 5B illustrate another system 500 that may be used to provide image(s) for use in the method 200 in accordance with some embodiments. The system 500 is a fluoroscopic system, and includes an x-ray source 502, an imager 504, and an arm 506 coupled to the source 502 and the imager 504. When using the fluoroscopic system 500 to perform the method 200, the x-ray source 502 and the imager 504 may be placed at a first position (FIG. 5A). The x-ray source 502 then delivers x-ray beams to generate a first sequence of images using the imager 504 while the patient 28 is undergoing respiratory motion. The x-ray source 502 and the imager 504 are then positioned at different positions (FIG. 5B) such that images may be acquired for the patient 28 at a different angle. The x-ray source 502 then delivers x-ray beams to generate a second sequence of images using the imager 504 while the patient 28 is undergoing respiratory motion. When performing the method 200, the processor 54 may select one of the images from the first sequence as the first image (Step 202), and may select one of the images from the second sequence as the second image (Step 204). In such cases, the first and second images in the method 200 are fluoroscopic or x-ray images.

In other embodiments, other types of imaging devices, such as a PET machine that generates PET images, a SPECT machine that generates SPECT images, a MRI system that generates MRI images, a tomosynthesis system that generates tomosynthesis images, or a camera (e.g., a CCD camera), may also be used to perform method 200.

In further embodiments, the first image in method 200 may be obtained using a first imaging device, and the second image may be obtained using a second imaging device that is different from the first imaging device. For example, the first imaging device may be anyone of a CT machine, a radiation treatment machine, a PET machine, a SPECT machine, a MRI system, a tomosynthesis system, and a camera, while the second imaging device may be any of the foregoing devices that is different from the first imaging device.

Figure 6:
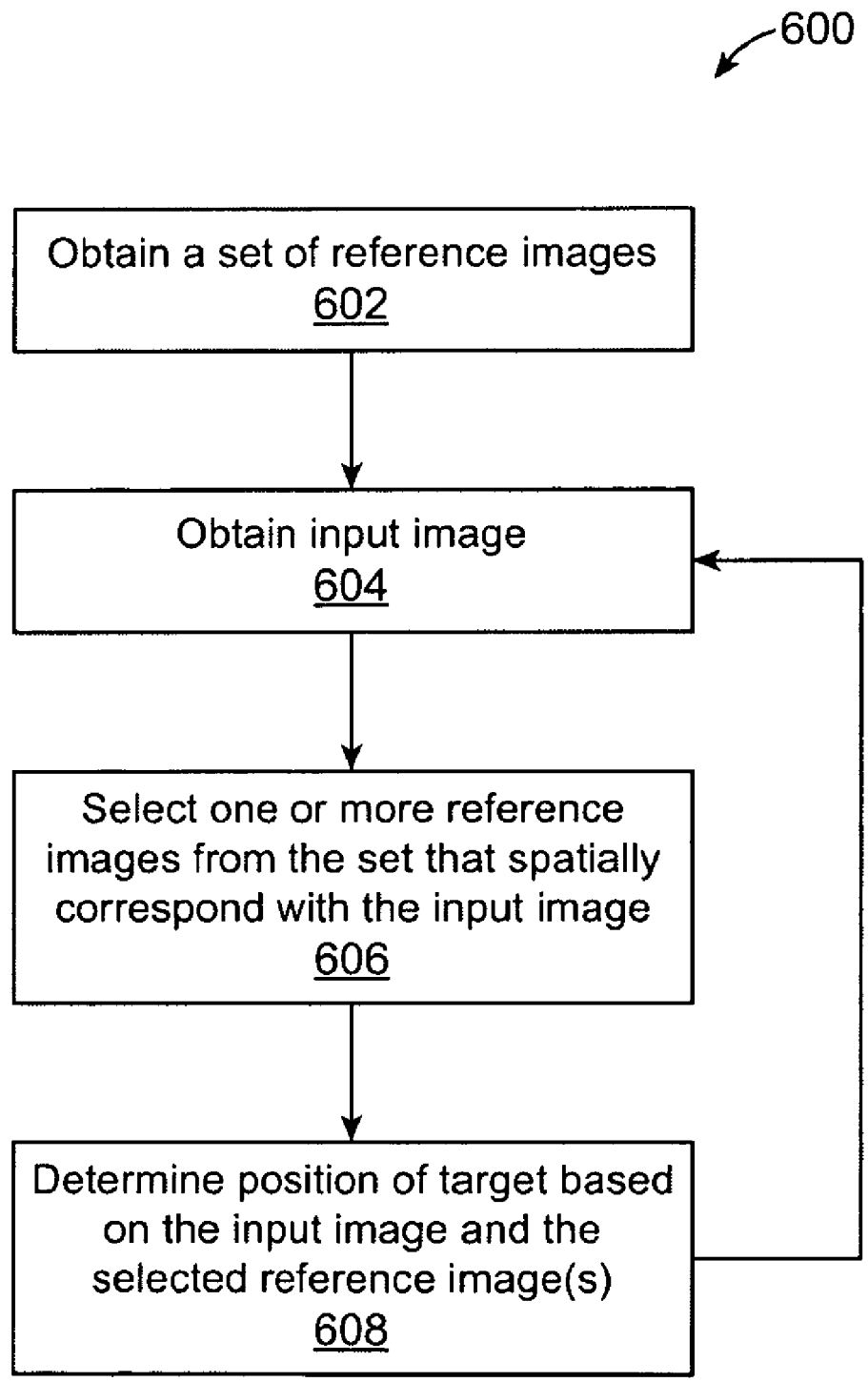
FIG. 6 illustrates a method for determining a target position in accordance with some embodiments.

As discussed, in some embodiments, the image processing technique described with reference to FIGS. 2 and 3 may be used to determine a position of a target. FIG. 6 illustrates a method 600 for determining a position of a target in accordance with some embodiments. The target may be an anatomical feature, one or more implant (such as radio-opaque markers), a medical device (e.g., a surgical clip), or other objects that is capable of being imaged. In other embodiments, the target may be any track point selected to track an object. For example, the track point may be a center of mass for a plurality of markers. Thus, the target needs not be an object itself.

First a set of reference images are obtained (Step 602). In the illustrated embodiments, the set of reference images may be projection images that are obtained using the system 10 of FIG. 1. In particular, the projection images are obtained previously when the patient 28 is undergoing physiological movement. Thus, the projection images have respective images of the target when the target is at different positions. The projection images are then processed so that a position of a target relative to some arbitrary coordinate system is determined for each of the projection images. Various techniques known in the art may be used for such purpose. Thus, each reference image has a position of a target associated therewith.

Next an input image is obtained (Step 604). In the illustrated embodiments, the input image may be obtained using the same system 10. In such cases, when generating the input image, the patient 28 may be positioned relative to the system 10 such that it is the same as the relative position between the patient 28 and the system 10 when the reference images are generated in step 602. Alternatively, the relative position between the patient 28 and the system 10 in step 604 may be different from that in step 602. In such cases, the processor 54 may be configured to register the position of the patient 28 in step 602, and the position of the patient 28 in step 604, and use these information to process images, e.g., perform coordinate transformation, image shifting, region-of-interest selection, etc.

In other embodiments, the input image and the reference images may be obtained using a different image systems. For example, the input image may be obtained using an imaging system (which is different from that for generating the reference images) for tracking a position of the target during a treatment procedure. In such cases, the relative position between the patient 28 and the image system 10 (e.g., the source 20 or the imager plane) in step 602 may be the same as the relative position between the patient 28 and the system that is used to generate the input image. Alternatively, the relative position between the patient 28 and the system 10 may be different from the relative position between the patient 28 and the system used to generate the input image. In such cases, the processor 54 may register the coordinate system of the image system 10 with the coordinate system of the system that is for generating the input image.

Figure 7:
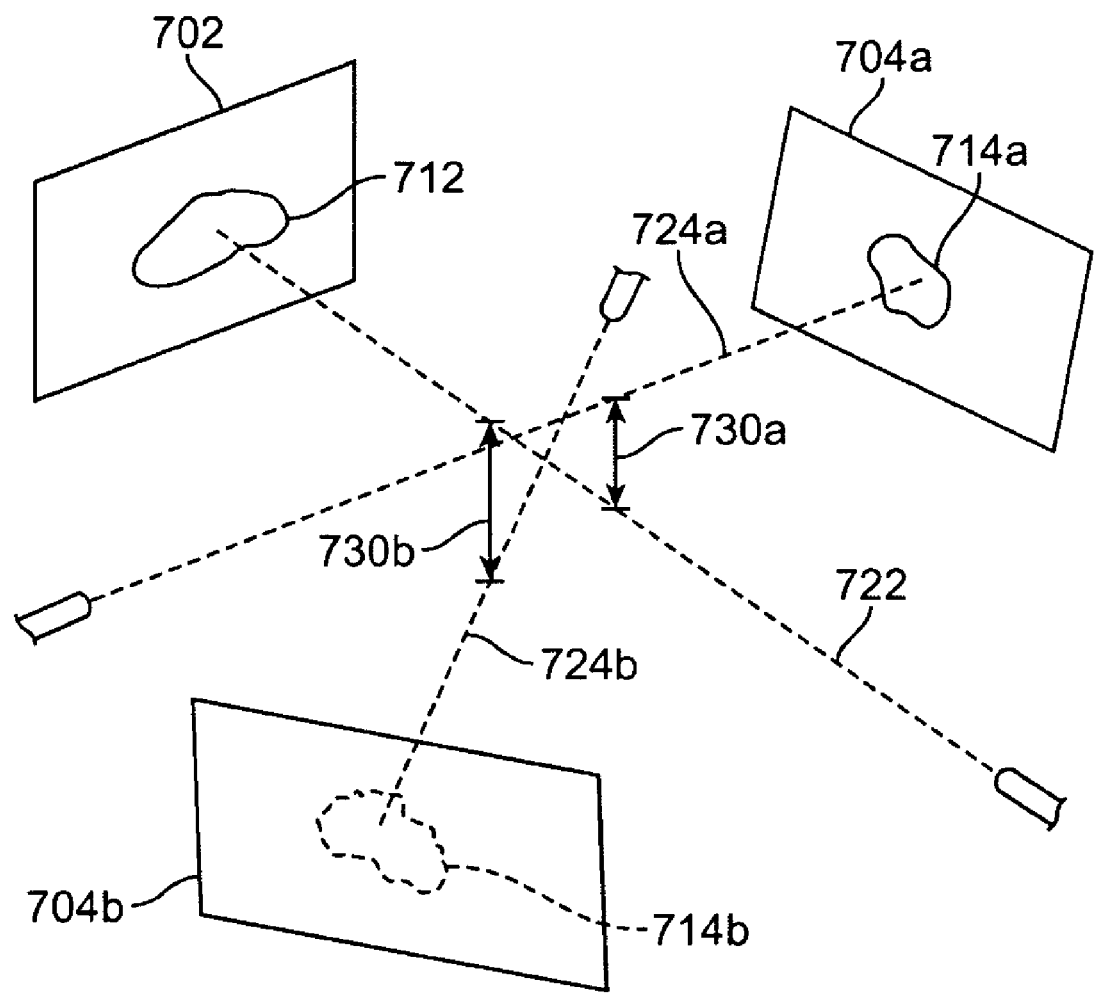
FIG. 7 illustrates a technique for selecting reference image(s) that spatially correspond with an input image.

The processor 54 then selects one or more reference images from the reference image set that spatially correspond with the input image (Step 606). FIG. 7 illustrates a technique for selecting a reference image that spatially corresponds with the input image in accordance with some embodiments. In the example, images 704*a*, 704*b* are reference images, and image 702 is an input image. Reference mages 704*a*, 704*b* may be generated previously using the system 10 by rotating the radiation source 20 at different gantry angles while the target is undergoing motion. Thus, the images 704*a*, 704*b* are obtained at different times. The target (not shown in the figure for clarity) that is being imaged appears as image 714*a* and image 714*b*, in image frames 704*a*, 704*b* respectively. The target also appears as image 712 in the current input image 702. In step 606, the processor 54 determines a projection line 722 that extends between the source 20 and the target image 712 in the image frame 702. The processor 54 also determines a plurality of projection lines 724 for respective reference images 704, wherein each projection line 724 extends between the source 20 and the target image 714 in the corresponding reference image 704. The processor 54 then determines, for each projection line 724, an epipolar distance 730 that is between the projection line 722 of the input image 702 and the projection line 724 for the corresponding reference image 704. The epipolar distance 730 is measured in a direction that is perpendicular to both the projection line 722 and the projection line 724. In the illustrated example, two reference images 704*a*, 704*b*, two corresponding projection lines 724*a*, 724*b*, and two corresponding epipolar distances 730*a*, 730*b* are shown. However, in some embodiments, the number of reference images 704, the number of projection lines 724, and the number of epipolar distances may be more than two.

In some embodiments, the processor 54 is configured to select a reference image 704 that spatially corresponds with the input image 702 by comparing the distances 730*a*, 730*b* with a prescribed threshold, e.g., 5 mm or less. If the distance 730 for a reference image 704 is below the prescribed threshold, then it may be determined that the target's position when the input image 702 is generated corresponds (e.g., the same relative to certain arbitrary coordinate system) with the target's position when the reference image is generated. In the illustrated example, the distance 730*a* between the reference image's 704*a* projection line 724*a* and the projection line 722 is less than the prescribed threshold, and the distance 730*b* between the reference image's 704*b* projection line 724*b* and the projection line 722 is above than the prescribed threshold. Thus, the processor 54 selects the reference image 704*a* as spatially corresponding with the input image 702.

In other embodiments, the processor 54 may select the reference image 704 based on other techniques or criteria. For example, in other embodiments, the processor 54 may be configured to determine the position of the target by minimizing a mean squared distance between a point and all (or a subset of all—e.g., a subset of images for a prescribed phase range of a physiological cycle) the epipolar lines 730. In some cases, the epipolar distance may function to provide a measure of stereo match between at least two images (e.g., three images). In such cases, a point in space with minimum average squared distance to epipolar lines from target positions in all images is determined—this determined point is the triangulation result. Then the processor determines the root mean squared of the resulting distances from the determined point as a measure of stereo match. In other embodiments, the processor also determines the line with largest distance to this solution, and then performs a test to see if that is an outlier. One way to identify an outlier is to exclude a projection image from the set used to calculate triangulation result, and see if the measure of stereo match is significantly increased. For example, if the root mean squared of the remaining distances (for the respective remaining images) is reduced—say by 40 percent, then removed input image is determined as an outlier. In further embodiments, the processor may also be configured to check if the target in a just captured image matches a previous set by determining the distance of the epipolar line of the current image to the triangulation results of the previous set.

Returning to FIG. 6, the processor 54 next determines a position of the target (Step 608). Using the above example, in some embodiments, the position of the midpoint at the epipolar line 730 between the projection line 722 and the projection line 724a of the selected reference image 704a may be used as the position of the target. For the case in which the lines 722, 724a intersect each other, the position of the intersection point may be used as the position of the target. In some cases, the processor 54 may select two or more reference images 704 that spatially correspond with the input image 702. This may be the case, for example, when the epipolar distances 300 for two or more reference images 704 satisfy a prescribed criteria for selecting reference images 704. In such cases, the position of the target may be determined by calculating an average of the midpoint positions at the epipolar distances 300 for which the reference images 704 have been determined as spatially corresponding to the input image 702. In other embodiments, the position of the target may be determined using other criteria. For example, in other embodiments, the position of the target may be determined using a median value of the midpoint positions at the determined epipolar distances 300. The act of determining the position of the target by the processor 54 may be performed in real time (shortly, e.g., less than 1 second, after the input image is generated), or retrospectively.

In some embodiments, additional input images are generated, and the method 600 repeats steps 604-608. In such cases, the processor 54 continuously determines the positions of the target as it receives additional input images. The determined positions of the target may be used for various purposes. In some embodiments, the position of the target is determined in real-time (shortly, e.g., less than 1 second, after the input image is generated) by the processor 54. In such cases, the target positions may be used by the processor 54 to gate an operation of a medical device, such as, to turn on a treatment or diagnostic radiation beam, to turn off a treatment or diagnostic radiation beam, to operate a collimator, to position a gantry, to position a radiation source, to position a patient support, etc.

Figure 8:
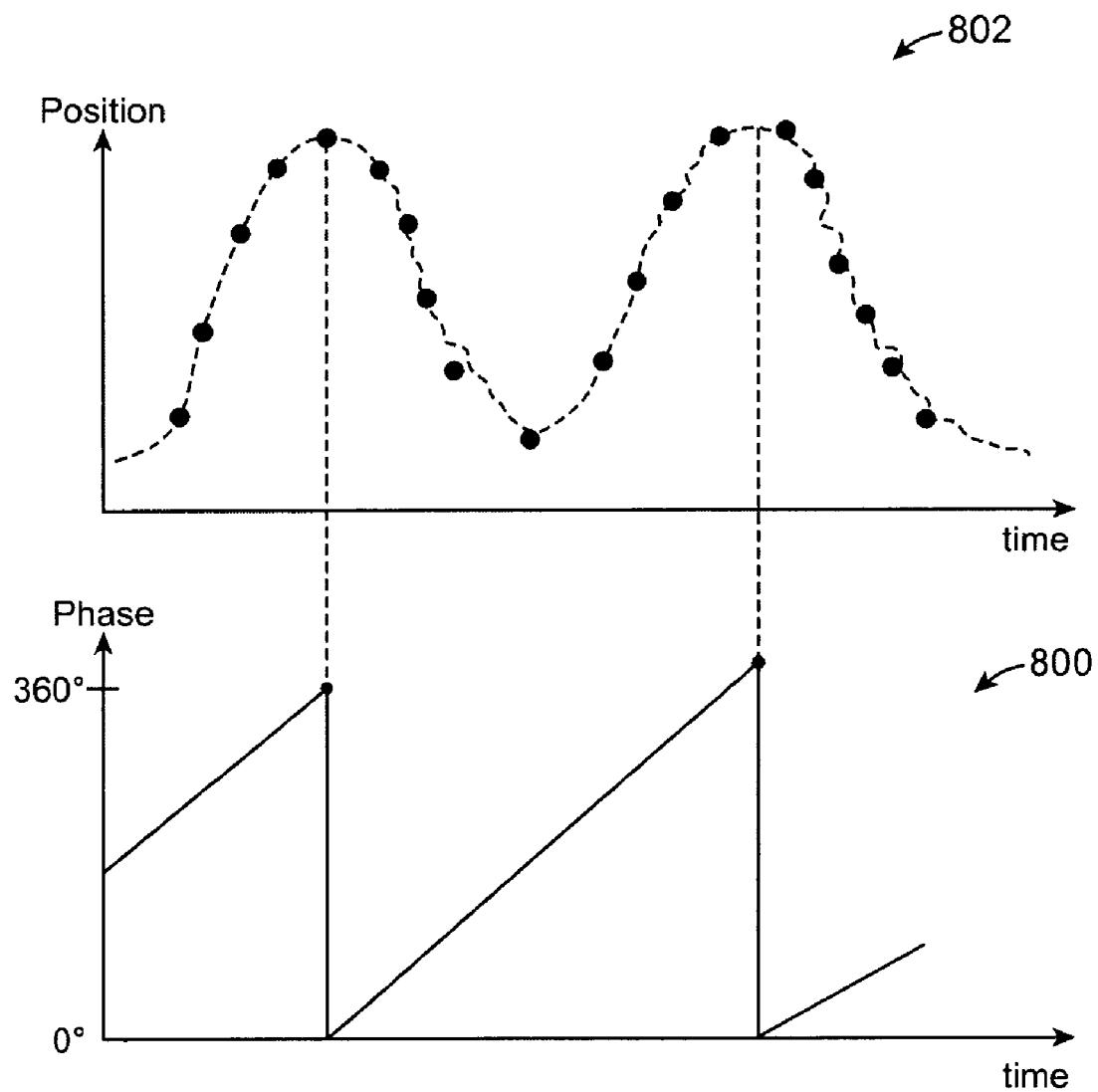
FIG. 8 illustrates a phase diagram aligned with a corresponding positional diagram in accordance with some embodiments.

The determined positions may also be used for other purposes in other embodiments. For example, in other embodiments that involve periodic movement, the determined positions may be used to determine corresponding phases of a physiological cycle. The phase of a physiological cycle represents a degree of completeness of a physiological cycle. In some embodiments, the phases of a respiratory cycle may be represented by a phase variable having values between 0° and 360°. FIG. 8 illustrates an example of a phase diagram 800 that is aligned with a corresponding position diagram 802. Position diagram 802 includes positional points of the target determined using embodiments of the technique described herein. In the illustrated example, a phase value of 0° (and 360°) represents a peak of an inhale state, and the phase value varies linearly between 0° and 360° in a physiological cycle.

The above described technique for determining a target position is advantageous in that it does not require using a separate position monitoring system to keep track with the object's positions while the images are generated. The above described technique is also advantageous in that it does not require comparison of images that are in a same plane. Rather, as illustrated in the embodiments, the input image 702 may be generated at a different image plane as the image planes for the reference images. In some cases, determining a target position using the above technique may yield a result that is within 0.1 mm accuracy or better. Further, the above technique advantageously allows determination of target positions even when the image system for generating input images is different from the image system used for generating the reference images.

It should be noted that the reference image and the input image in the above embodiments need not be obtained using a same imaging device or imaging modality. In other embodiments, the reference image may be obtained using a first imaging device, and the input image may be obtained using a second imaging device that is different from the first imaging device. For example, the first imaging device may be anyone of a CT machine, a radiation treatment machine, a PET machine, a SPECT machine, a MRI system, a tomosynthesis system, and a camera, while the second imaging device may be any of the foregoing devices that is different from the first imaging device. Also, in other embodiments, any of the reference images and/or the input image can be an image that is reconstructed from a set of projection images, e.g., to form a tomosynthesis image. For example, several projection images acquired over a short gantry arc are used to reconstruct a tomosynthesis image in which an implanted marker may be highly enhanced as a result of the combining of several images. The tomosynthesis image is then used as an input image or as a reference image in the sequential stereo technique described herein.

In the above embodiments of method 600, the motion of the target has been described as periodic. However, in other embodiments, the above technique may be used to determine a target position for a target that is undergoing non-periodic motion, e.g., random movement. In such cases, the processor 54 is configured to use the entire set of reference images. In some embodiments, the processor 54 is also configured (e.g., programmed and/or built) to receive signals from the motion monitoring system regarding a speed and/or direction of motion of the target, and use such information to select reference image(s) that spatially correspond with the input image. In particular, the speed and/or direction of motion of the target (at a previous time) may allow the processor 54 to predict the current position of the target. Based on this, the processor 54 can narrow down the pool of available reference images that may possibly spatially correspond with the input image.

In the above embodiments, the set of reference images 704 are generated by rotating the source 20 when the patient 28 is at a certain position relative to the system 10. In other embodiments, two sets of reference images 704 may be provided, wherein the first set of reference images 704 is generated by rotating the source 20 when the patient 28 is at a first position relative to the system 10, and the second set of reference images 704 is generated by rotating the source 20 when the patient 28 is at a second position relative to the system 10. Such may be accomplished by positioning the patient 28 or the patient support 14 relative to the source 20 after the first set of reference images is generated, but before the second set of reference images is generated. Alternatively, such may be accomplished by positioning the system 10, or a part of the system 10 (e.g., the source 20 and/or the gantry 12) relative to the patient 28. In some embodiments, when performing the method 600 using two sets of reference images 704, the processor 54 is configured to determine the position of the target by minimizing a mean squared distance between a point and all (or a subset of all) the epipolar lines 730 for both sets of reference images 704. In other embodiments, the processor 54 may be configured to determine the position of the target using other techniques. For example, in other embodiments, the processor 54 may be configured to determine a first position of the target by minimizing a mean squared distance between a first point and all (or a subset of all) the epipolar lines 730 for the first set of reference images 704, determine a second position of the target by minimizing a mean squared distance between a second point and all (or a subset of all) the epipolar lines 730 for the second set of reference images 704, and then determine an average of the first and second positions as the position of the target. Using two sets of reference images 704 is advantageous in that it allows the processor 54 to determine a three-dimensional position of the target more accurately.

Figure 9:
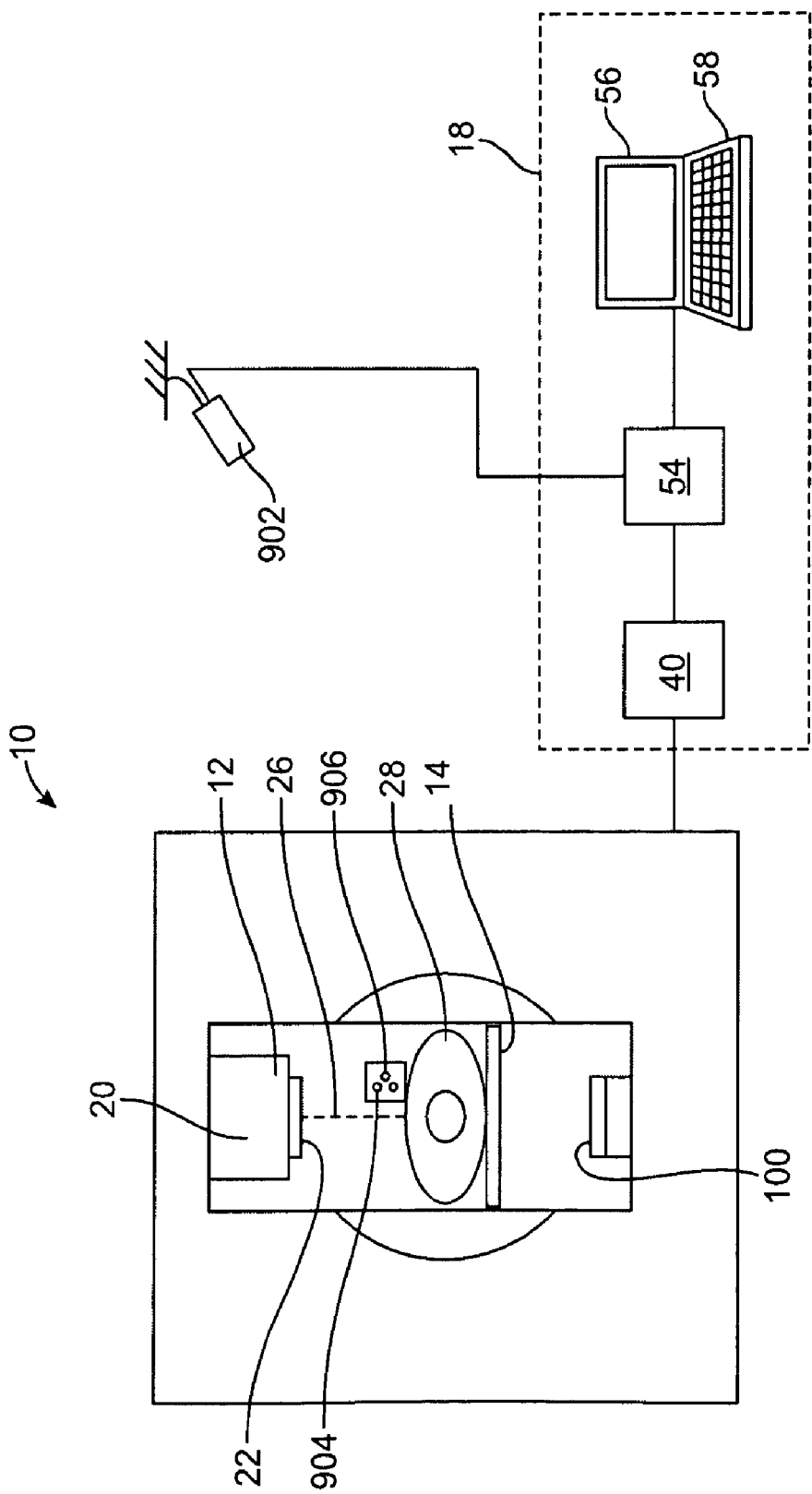
FIG. 9 illustrates another radiation system that includes a position monitoring system with which embodiments described herein may be practiced.

In any of the embodiments described herein, the system 10 may further include a motion monitoring system for monitoring a breathing state of the patient 28 when the images (e.g., reference images and input images in method 600, or any of the images in method 200) are generated. The motion monitoring system may include a camera 902 for viewing a marker block 904 with markers 906 that is coupled to the patient 28 (FIG. 9). Alternatively, the camera may be configured to use other things as marker(s), such as a patient's clothes, a physiological feature of the patient 28, etc. Examples of a motion monitoring system include Varian's RPM product, which is capable of recording amplitudes and phases of a breathing signal along with image data. In other embodiments, the motion monitoring system may be other systems known in the art, such as a strain-gauge for measuring chest expansion, etc., as long as the system can determine a state of the patient's 28 breathing.

During use of the system 10 that includes the motion monitoring system, the motion monitoring system determines a breathing state of the patient 28 while the system 10 generates a plurality of images (e.g., images in method 200, or reference and input images in method 600), and the breathing state is recorded. In some embodiments, when determining whether two images correspond spatially with each other, the processor 54 considers the breathing state of the target when the two images are generated. For example, when determining whether the first image (in step 202 of method 200) spatially corresponds with the second image (in step 204 of method 200), the processor 54 compares the breathing state of the target when the first image is generated with the breathing state of the target when the second image is generated. Similarly, for method 600, when determining whether a reference image spatially corresponds with an input image, the processor 54 compares the breathing state of the target when the reference image is generated with the breathing state of the target when the input image is generated. In some cases, if the images correspond approximately to a same breathing state, e.g., exhaling, inhaling, breath-hold at inhale, breath-hold at exhale, etc., then the processor 54 determines that the two images are possible candidates for matching. If so, the processor 54 may perform further analysis, e.g., determining epipolar distances, etc., to determine whether the two images correspond spatially with each other, as described herein. Use of a motion monitoring system is advantageous in that it maximizes the probability that the images used in triangulation correspond to approximately a same target position. It is also advantageous in that it allows the processor 54 to determine whether a given target position is at an inhale or exhale phase. For such purpose, because the processor 54 only needs to discriminate between inhale and exhale phases, the motion monitoring system does not need to provide results of sensed motion with high accuracy. This, in turn, may simplify design and computation time for the motion monitoring system. Also, the motion monitoring system advantageous allows the processor 54 to narrow down the pool of available images that may spatially correspond with another image.

Also, in any of the embodiments described herein, the processor 54 may use the criteria that $|a|>30°$ and $|a-180°|>30°$ as part of the criteria for determining whether two images spatially correspond with each other, wherein "a" represents a stereo separation angle between an image pair (e.g., angular separation between axes of respective images).

In other embodiments, the above triangular method may be used to determine whether a target has undergone movement. For example, in some cases, the target may be expected to stay stationary during a procedure. In such cases, the processor 54 receives an input image of the target, determines a projection line for the input image, and determines an epipolar distance between the projection line of the input image and a projection line of one of the reference images. If the epipolar distance is within a prescribed threshold, e.g., 5 mm, then the processor 54 determines that the target has not moved. On the other hand, if the epipolar distance is more than a prescribed threshold, then the processor 54 determines that the target has moved. In such cases, the processor 54 may causes an alarm, e.g., a visual or an audio alarm, to be generated. In some cases, instead of, or in addition to, generating an alarm, the processor 54 may interrupt a medical procedure when it determines that the target has moved.

It should be noted that the embodiments of the method described herein are not limited to determining position of a target that undergoes periodic movement (e.g., movement associated with breathing or heart beat), and that the embodiments of the method described herein may be used to determine position of a target that undergoes any type of movement, whether it is periodic or non-periodic. For example, in some embodiments, the system and method described herein may be used for monitoring and tracking prostate motion, which may include shifts and multiple excursions during an imaging or treatment session—e.g., the prostate may move to a different position for a few seconds and then return to the original position.

Computer System Architecture

Figure 10:
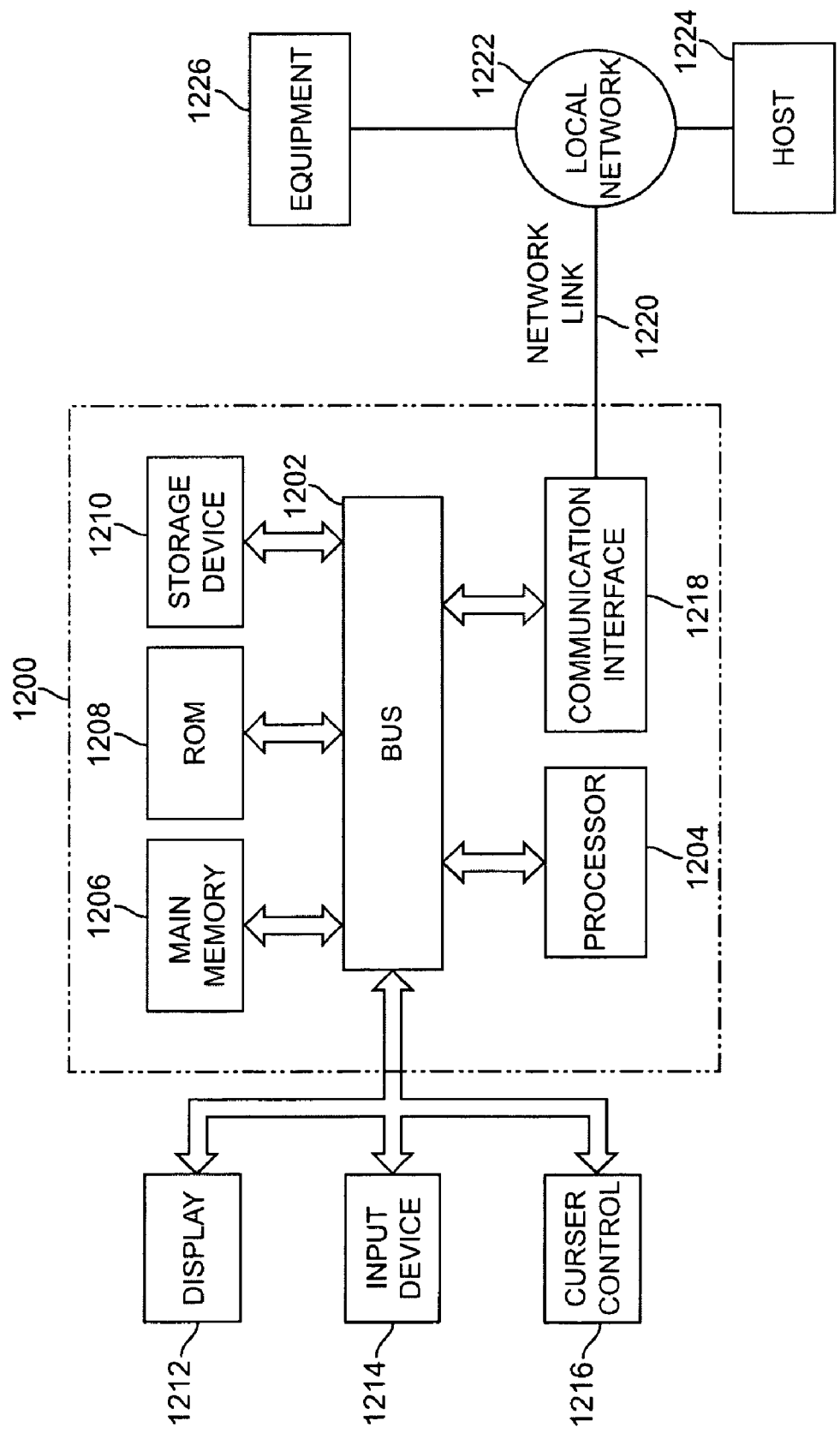
FIG. 10 is a block diagram of a computer system architecture, with which embodiments described herein may be implemented.

FIG. 10 is a block diagram that illustrates an embodiment of a computer system 1200 upon which an embodiment of the invention may be implemented. Computer system 1200 includes a bus 1202 or other communication mechanism for communicating information, and a processor 1204 coupled with the bus 1202 for processing information. The processor 1204 may be an example of the processor 54 of FIG. 1, or another processor that is used to perform various functions described herein. In some cases, the computer system 1200 may be used to implement the processor 54. The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT), for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions (e.g., calculation) in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. Volatile media includes dynamic memory, such as the main memory 1206. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. For example, the term "image" needs not be limited to an image that is displayed visually, and may refer to image data that is stored. Also, the term "processor" may include one or more processing units, and may refer to any device that is capable of performing mathematical computation implemented using hardware and/or software. Further, in any of the embodiments described herein, instead of using the processor 54 to perform the various functions described, a separate processor may be used. In addition, it should be noted that the terms "first image" and "second image" refer to two images that are different or separate, and therefore, do not necessarily refer to the order in which the images are generated. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A method for determining a position of a target, comprising:
   obtaining a first image of the target;
   obtaining a second image of the target, wherein the first and the second images have different image planes and are generated at different times;
   processing the first and second images to determine whether the target in the first image corresponds spatially with the target in the second image; and
   determining the position of the target based on a result of the act of processing;
   wherein the act of processing the first and second images comprises determining a first distance between a first line intersecting the image plane of the first image and a second line intersecting the image plane of the second image, and wherein act of determining the position of the target comprises using at least the determined first distance.

2. The method of claim 1, wherein the target in the first image is determined to be corresponding to the target in the second image when the determined first distance is a minimum one among a plurality of calculated distances.

3. The method of claim 1, wherein the act of determining the position of the target comprises using a coordinate of a midpoint on a line that is normal to the first and the second lines.

4. The method of claim 1, further comprising:
   obtaining a third image of the target, wherein a plane of the third image is different from the image plane of the first image and the image plane of the second image;
   processing the third image to determine a third line that intersects a plane of the third image; and
   determining a second distance between the third line and a reference point associated with one or both of the first and second lines;
   wherein the act of determining the position of the target comprises using the first distance and the second distance.

5. A method for determining a position of a target, comprising:
   obtaining a first image of the target;
   obtaining a second image of the target, wherein the first and the second images have different image planes and are generated at different times;
   processing the first and second images to determine whether the target in the first image corresponds spatially with the target in the second image;
   determining the position of the target based on a result of the act of processing;
   obtaining a third image of the target, wherein the first, second, and third images are generated at different times;
   determining a second distance between the first and third lines; and
   comparing the first and second distance.

6. The method of claim 5, wherein the act of determining the position of the target comprises determining which of the first and second distance is smaller.

7. The method of claim 1, wherein the target is moving in an undefined path.

8. The method of claim 1, wherein the target is undergoing movement.

9. The method of claim 8, wherein the movement is associated with breathing.

10. The method of claim 8, wherein the movement is associated with cardiac movement.

11. The method of claim 1, wherein the first image and the second image are generated using a same imaging device.

12. The method of claim 11, wherein the first image and the second image are generated at different gantry angles of the imaging device.

13. The method of claim 1, wherein the first image and the second image are generated using different imaging devices.

14. A method for determining a position of a target, comprising:
    obtaining a first image of the target;
    obtaining a second image of the target, wherein the first and the second images have different image planes and are generated at different times;
    processing the first and second images to determine whether the target in the first image corresponds spatially with the target in the second image;
    determining the position of the target based on a result of the act of processing;
    wherein the first image is generated using a diagnostic device, and the second image is generated using a treatment device.

15. The method of claim 14, wherein the diagnostic device and the treatment device are integrated into a radiation system.

16. The method of claim 13, wherein one of the imaging devices comprises a camera.

17. The method of claim 13, wherein one of the imaging devices comprises an x-ray machine.

18. The method of claim 1, wherein the first image is one of a plurality of images in a set that are generated at different gantry angles.

19. The method of claim 1, further comprising determining additional positions of the target, wherein the determined position and the determined additional positions collectively form a trajectory for the target.

20. The method of claim 1, further comprising a state of the target based on the determined position.

21. The method of claim 20, wherein the state comprises a phase of a physiological cycle.

22. The method of claim 21, wherein the physiological cycle comprises a breathing cycle.

23. The method of claim 21, wherein the physiological cycle comprises a cardiac cycle.

24. The method of claim 1, wherein one of the first and the second images comprises a tomosynthesis image that is reconstructed using a plurality of projection images.

25. A system for determining a position of a target, comprising:
    a processor, wherein the processor is configured for
        obtaining a first image of the target;
        obtaining a second image of the target, wherein the first and the second images have different image planes and are generated at different times;
        processing the first and second images to determine whether the target in the first image corresponds spatially with the target in the second image; and
        determining the position of the target based on a result of the act of processing;
    wherein the processor is configured for processing the first and second images by determining a first distance between a first line intersecting the image plane of the first image and a second line intersecting the image plane of the second image, and wherein the processor is configured for determining the position of the target using at least the determined first distance.

26. A computer product having a non-transitory medium for storing a set of instruction, an execution of which causes a process to be performed, the process comprising:
obtaining a first image of the target;
obtaining a second image of the target, wherein the first and the second images have different image planes and are generated at different times;
processing the first and second images to determine whether the target in the first image corresponds spatially with the target in the second image; and
determining the position of the target based on a result of the act of processing;
wherein the act of processing the first and second images comprises determining a first distance between a first line intersecting the image plane of the first image and a second line intersecting the image plane of the second image, and wherein act of determining the position of the target comprises using at least the determined first distance.

27. A method for determining a position of a target, comprising:
obtaining a first image of the target;
obtaining a second image of the target, wherein the first and the second images are generated at different times;
processing the first image to determine a first line that intersects a plane of the first image;
processing the second image to determine a second line that intersects a plane of the second image;
determining a first distance between the first and second lines; and
determining the position of the target based at least in part on the determined first distance.

28. The method of claim 27, further comprising:
obtaining a third image of the target, wherein the first, second, and third images are generated at different times;
determining a second distance between the first and third lines; and
comparing the first and second distance.

29. The method of claim 28, wherein the act of determining the position of the target comprises determining which of the first and second distance is smaller.

30. The method of claim 27, wherein the act of determining the position of the target comprises using a coordinate of a midpoint on a line that is normal to the first and the second lines.

31. The method of claim 27, wherein the target is moving in an undefined path.

32. The method of claim 27, wherein the target is undergoing movement.

33. The method of claim 32, wherein the movement is associated with breathing.

34. The method of claim 32, wherein the movement is associated with cardiac movement.

35. The method of claim 27, wherein the first image and the second image are generated using a same imaging device.

36. The method of claim 35, wherein the first image and the second image are generated at different gantry angles of the imaging device.

37. The method of claim 27, wherein the first image and the second image are generated using different imaging devices.

38. The method of claim 37, wherein the first image is generated using a diagnostic device, and the second image is generated using a treatment device.

39. The method of claim 38, wherein the diagnostic device and the treatment device are integrated into a radiation system.

40. The method of claim 37, wherein one of the imaging devices comprises a camera.

41. The method of claim 37, wherein one of the imaging devices comprises an x-ray machine.

42. The method of claim 27, wherein the first image is one of a plurality of images in a set that are generated at different gantry angles.

43. The method of claim 27, further comprising determining additional positions of the target, wherein the determined position and the determined additional positions collectively form a trajectory for the target.

44. The method of claim 27, further comprising:
obtaining a third image of the target, wherein a plane of the third image is different from a plane of the first image and a plane of the second image;
processing the third image to determine a third line that intersects a plane of the third image; and
determining a second distance between the third line and a reference point associated with one or both of the first and second lines;
wherein the act of determining the position of the target comprises using the first distance and the second distance.

45. The method of claim 27, wherein one of the first and the second images comprises a tomosynthesis image that is reconstructed using a plurality of projection images.

46. A system for determining a position of a target, comprising:
a processor, wherein the processor is configured for
obtaining a first image of the target;
obtaining a second image of the target, wherein the first and the second images are generated at different times;
processing the first image to determine a first line that intersects a plane of the first image;
processing the second image to determine a second line that intersects a plane of the second image;
determining a first distance between the first and second lines; and
determining the position of the target based at least in part on the determined first distance.

47. A computer product having a non-transitory medium for storing a set of instruction, an execution of which causes a process to be performed, the process comprising:
obtaining a first image of the target;
obtaining a second image of the target, wherein the first and the second images are generated at different times;
processing the first image to determine a first line that intersects a plane of the first image;
processing the second image to determine a second line that intersects a plane of the second image;
determining a first distance between the first and second lines; and
determining the position of the target based at least in part on the determined first distance.

* * * * *